(12) United States Patent
Chen

(10) Patent No.: US 10,146,110 B1
(45) Date of Patent: Dec. 4, 2018

(54) THREE-DIMENSIONAL FLOATING IMAGE SYSTEM

(71) Applicant: Chunghwa Picture Tubes, LTD., Taoyuan (TW)

(72) Inventor: Chien-Hung Chen, New Taipei (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 0 days.

(21) Appl. No.: 15/818,782

(22) Filed: Nov. 21, 2017

(30) Foreign Application Priority Data

Oct. 16, 2017 (CN) .................... 2017 2 1326203 U

(51) Int. Cl.
| | |
|---|---|
| *G03B 21/14* | (2006.01) |
| *G02B 27/22* | (2018.01) |
| *G03B 21/28* | (2006.01) |
| *H04N 13/346* | (2018.01) |
| *H04N 13/388* | (2018.01) |

(52) U.S. Cl.
CPC ....... *G03B 21/142* (2013.01); *G02B 27/2292* (2013.01); *G03B 21/28* (2013.01); *H04N 13/346* (2018.05); *H04N 13/388* (2018.05)

(58) Field of Classification Search
CPC .. G02B 27/2292; G03B 21/142; G03B 21/28; H04N 13/0443; H04N 13/0488
See application file for complete search history.

(56) References Cited

U.S. PATENT DOCUMENTS

| | | | |
|---|---|---|---|
| 2011/0164032 A1 | 7/2011 | Shadmi | |
| 2012/0081524 A1* | 4/2012 | Joseph | ................. H04N 13/346 348/51 |
| 2013/0009862 A1* | 1/2013 | Chan | .................. G02B 27/2292 345/156 |
| 2018/0063520 A1* | 3/2018 | Chung | ............... H04N 13/0434 |

FOREIGN PATENT DOCUMENTS

| | | |
|---|---|---|
| CN | 203351176 | 12/2013 |
| TW | M388006 | 9/2010 |
| TW | I572899 | 3/2017 |

* cited by examiner

*Primary Examiner* — Sultan Chowdhury
*Assistant Examiner* — Magda Cruz
(74) *Attorney, Agent, or Firm* — JCIPRNET

(57) ABSTRACT

A 3D floating image system including a first optical element, a first image source and a second image source is provided. The first optical element has a first side and a second side opposite to each other. The first image source and the second image source are respectively located at the first side and the second side of the first optical element. A first image light provided by the first image source is reflected to the first side by the first optical element, and forms a first image at the second side. A second image light provided by the second image source is transmitted from the second side to the first side and passes through the first optical element, and forms a second image at the second side. The first image and the second image are spaced by a distance, and the distance is adjustable.

14 Claims, 4 Drawing Sheets

THREE-DIMENSIONAL FLOATING IMAGE SYSTEM

CROSS-REFERENCE TO RELATED APPLICATION

This application claims the priority benefit of China application serial no. 201721326203.5, filed on Oct. 16, 2017. The entirety of the above-mentioned patent application is hereby incorporated by reference herein and made a part of this specification.

BACKGROUND OF THE INVENTION

Field of the Invention

The invention relates to a floating image system, and particularly relates to a three-dimensional floating image system.

Description of Related Art

Floating projection is a kind of image display method, by which by suitably controlling an environmental light, a plane image may achieve a visual effect of a three-dimensional (3D) image floating in the air. For example, a present floating projection device includes an inverted pyramid type translucent element and a display or a projector, where an image light emitted by the display or the projector is reflected by a reflecting surface of the pyramid type translucent element to enter user's eyes, so as to form a floating image in internal of the pyramid type translucent element. Such technique has been applied to many commercial stage performances or new product displays. However, after design parameters of the reflecting surface are determined, an imaging position of the floating image is also determined, which is lack of flexibility, and a 3D display effect thereof is limited.

SUMMARY OF THE INVENTION

The invention is directed to three-dimensional (3D) floating image system, which has a good 3D display effect.

The invention provides a 3D floating image system including a first optical element, a first image source and a second image source. The first optical element has a first side and a second side opposite to each other. The first image source and the second image source are respectively located at the first side and the second side of the first optical element. A first image light provided by the first image source is reflected to the first side by the first optical element, and forms a first image at the second side. A second image light provided by the second image source is transmitted from the second side to the first side and passes through the first optical element, and forms a second image at the second side. The first image and the second image are spaced by a distance, and the distance is adjustable.

In an embodiment of the invention, a distance between the first optical element and the first image source, a distance between the first optical element and the second image source or a combination thereof is adjustable.

In an embodiment of the invention, the 3D floating image system further includes a mobile mechanism, which is connected to the first image source, a second image source or a combination thereof.

In an embodiment of the invention, the mobile mechanism includes a motor and a driving element connected to the motor.

In an embodiment of the invention, the first image source includes a first display panel having a first display surface. The first display panel provides the first image light. The first display surface of the first display panel is inclined relative to the first optical element.

In an embodiment of the invention, the second image source includes a second display panel. The second display panel provides the second image light, where a second display surface of the second display panel is inclined relative to the first optical element.

In an embodiment of the invention, a normal direction of the first display surface is intersected with a normal direction of the second display surface.

In an embodiment of the invention, the second image source further includes a second optical element. The second optical element is inclined relative to the second display surface, where the second image light is reflected by the second optical element and passes through the first optical element in sequence.

In an embodiment of the invention, a normal direction of the first display surface is parallel with a normal direction of the second display surface.

In an embodiment of the invention, the first image source includes a first projector and a first screen. The first projector provides the first image light. The first screen is inclined relative to the first optical element, where the first image light is sequentially reflected by the first screen and reflected by the first optical element.

In an embodiment of the invention, the second image source includes a second display panel. The second display panel provides the second image light. A second display surface of the second display panel is inclined relative to the first optical element.

In an embodiment of the invention, a normal direction of an image receiving surface of the first screen is intersected with a normal direction of the second display surface.

In an embodiment of the invention, the second image source includes a second projector, a second screen and a second optical element. The second projector provides the second image light. The second optical element is inclined relative to the second screen, where the second image light is reflected by the second screen, reflected by the second optical element and passes through the first optical element in sequence.

In an embodiment of the invention, a normal direction of an image receiving surface of the first screen is parallel with a normal direction of an image receiving surface of the second screen.

According to the above description, because the distance between the first image and the second image is adjustable, the distance between the first image and the second image may be adjusted according to an application of image content, so as to form a vivid 3D floating image.

DESCRIPTION OF EMBODIMENTS

Figure 1:
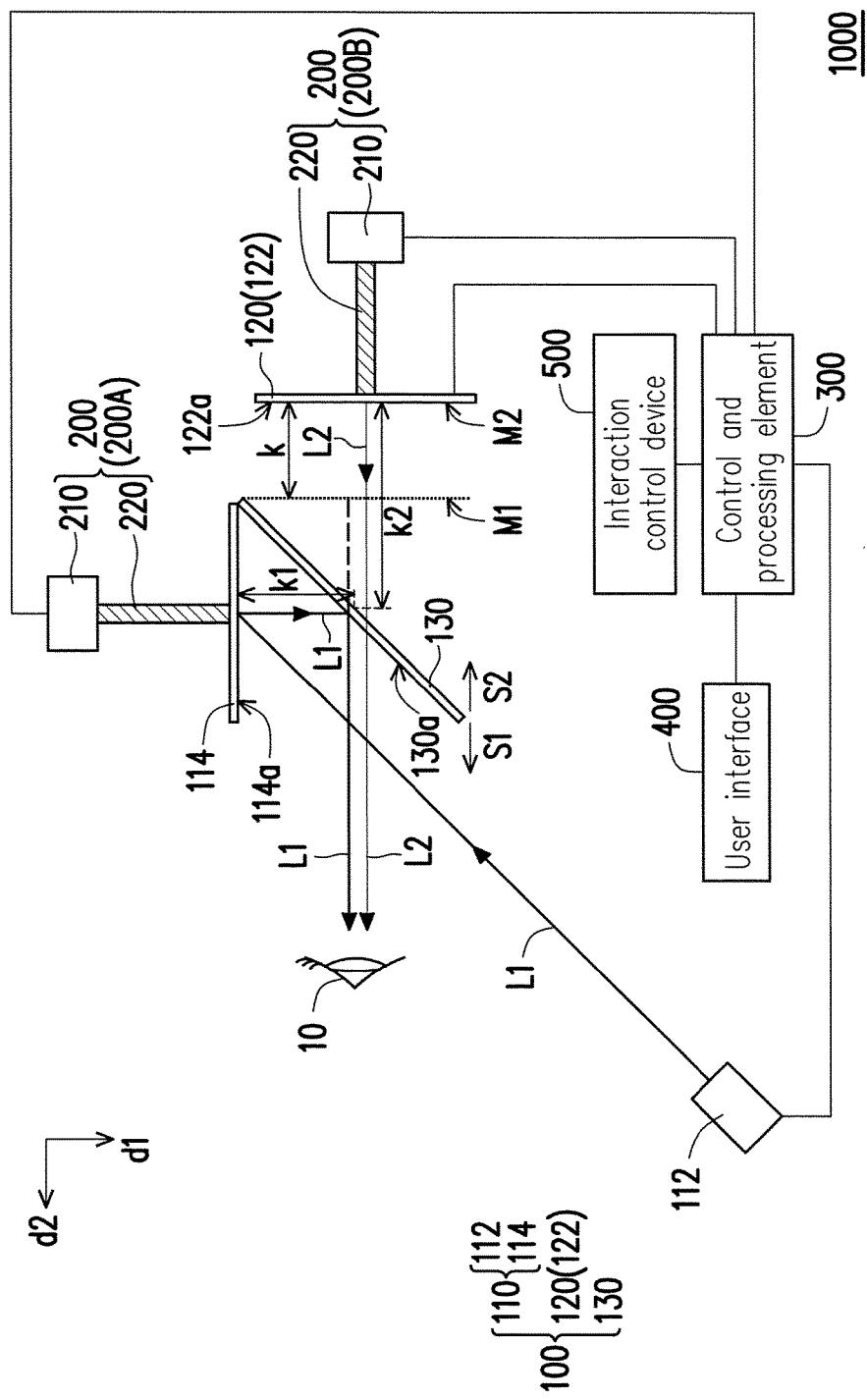
FIG. 1 is a schematic diagram of a three-dimensional (3D) floating image system according to an embodiment of the invention.

Referring to FIG. 1, the 3D floating image system 1000 includes an optical mechanism 100. The optical mechanism 100 includes a first image source 110, a second image source 120 and a first optical element 130. The first optical element 130 is a transflective element. For example, in the present embodiment, the first optical element 130 may be made of glass, acrylic or heat insulation paper. However, the invention is not limited thereto, and in other embodiments, the first optical element 130 may also be made of other proper materials.

The first optical element 130 has a first side S1 and a second side S2 opposite to the first side S1. The first image source 110 is located at the first side S1 of the first optical element 130. A first image light L1 provided by the first image source 110 is reflected to the first side S1 by the first optical element 130, and forms a first image M1 at the second side S2. For example, in the present embodiment, the first image source 110 includes a first projector 112 and a first screen 114. An image receiving surface 114a of the first screen 114 is inclined relative to a reflecting surface 130a of the first optical element 130. The first image light L1 emitted by the first projector 112 is projected to the image receiving surface 114a of the first screen 114, reflected by the image receiving surface 114a of the first screen 114, and reflected by the reflecting surface 130a of the first optical element 130 in sequence, and is transmitted to an eye of a user 10. In this way, the user 10 located at the first side S1 may view a virtual image located at the second side S2, i.e. the first image M1. However, the invention is not limited thereto, and in other embodiments, the first image source 110 may also be other proper types of image source, which is described later with reference of other figures.

The second light source 120 is located at the second side S2 of the first optical element 130. A second image light L2 provided by the second image source 120 is transmitted from the second side S2 to the first side S1 and passes through the first optical element 130, and forms a second image M2 at the second side S2. For example, in the present embodiment, the second image source 120 may be a second display panel 122. A second display surface 122a of the second display panel 122 is inclined relative to the reflecting surface 130a of the first optical element 130. A normal direction d2 of the second display surface 122a is intersected with a normal direction d1 of the image receiving surface 114a of the first screen 114. The second image light L2 emitted by the second display panel 122 may directly pass through the first optical element 130, and is transmitted to the eye of the user 10. In this way, the user 10 located at the first side S1 may view a real image located at the second side S2, i.e. second image M2 of the present embodiment. However, the invention is not limited thereto, and in other embodiments, the second image source 120 may also be other types of image source, and the second image M2 may also be a virtual image, which is described later with reference of other figures.

It should be noted that the first image M1 and the second image M2 is spaced by a distance k. For example, in the present embodiment, the first image M1 is located closer to the user 10, and the second image M2 is located away from the user 10. By suitably design content of the first image M1 and content of the second image M2, the first image M1 and the second image M2 may construct a 3D floating image, which is described below with reference of FIG. 2.

Figure 2:
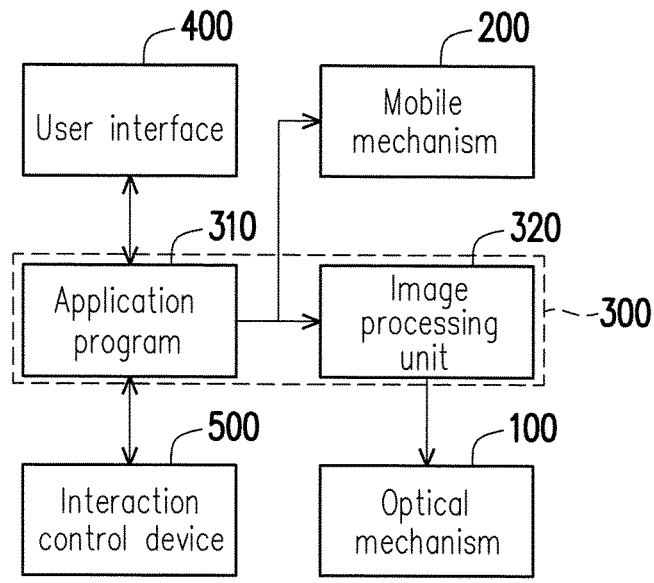
FIG. 2 is a block diagram of a part of a 3D floating image system according to an embodiment of the invention.

Referring to FIG. 1 and FIG. 2, the 3D floating image system 1000 further includes a control and processing element 300. In the present embodiment, the control and processing element 300 is, for example, a computer, though the invention is not limited thereto. The control and processing element 300 has an application program 310 and an image processing unit 320. The application program 310 provides a mother image content (for example, a game image content) to the image processing unit 320. The image processing unit 320 divides the mother image content into a foreground sub image content and a background sub image content. For example, the mother image content includes a plurality of pixel data p(x, y), and the plurality of pixel data p(x, y) respectively have a plurality of depth data depth(x, y); first, the image processing unit 320 may sharpen the plurality of depth data depth(x, y), i.e. to increase a difference between the plurality of depth data depth(x, y); then, the image processing unit 320 may divide the plurality of pixel data p(x, y) of the mother image content into a plurality of pixel data $p(x_1, y_1)$ belonging to the foreground sub image content and a plurality of pixel data $p(x_2, y_2)$ belonging to the background sub image content according to the sharpened plurality of depth data depth(x, y). For example, if depth(x, y) a, the image processing unit 320 determines that the corresponding pixel data p(x, y) belongs to the pixel data $(x_1, y_1)$ of the foreground sub image content; and if depth(x, y)<α, the image processing unit 320 determines that the corresponding pixel data p(x, y) belongs to the pixel data $p(x_2, y_2)$ of the background sub image content, where α is a predetermined value. The image processing unit 320 is electrically connected to the first image source 110 and the second image source 120. In the present embodiment, the image processing unit 320 may input the pixel data $p(x_1, y_1)$ belonging to the foreground sub image content to the first image source 110, such that the first image M1 located closer to the user 10 is displayed as the foreground sub image content; the image processing unit 320 may input the pixel data $p(x_2, y_2)$ belonging to the background sub image content to the second image source 120, such that the second image M2 located away from the user 10 is displayed as the background sub image content. In this way, the user 10 simultaneously viewing the first image M1 (or the foreground image content) and the second image M2 (or the background image content) is able to form a 3D floating image in the mind.

The distance k between the first image M1 and the second image M2 is adjustable. In the present embodiment, the distance k between the first image M1 and the second image M2 may be controlled according to application of the mother image content provided by the application program 310. To be specific, the 3D floating image system 1000 further includes a mobile mechanism 200 electrically connected to the control and processing element 300. The control and processing element 300 may use the mobile mechanism 200 to control the distance k between the first image M1 and the second image M2.

For example, the mobile mechanism 200 is connected to the first image source 110 and/or the second image source 120. The mobile mechanism 200 may change a position of the first image source 110 and/or a position of the second image source 120, so as to adjust the distance k between the first image M1 and the second image M2. For example, in the present embodiment, the mobile mechanism 200 includes a first mobile mechanism 200A and a second mobile mechanism 200B, where the first mobile mechanism 200A is connected to the first image source 110, and the second mobile mechanism 200B is connected to the second image source 120. Each of the mobile mechanisms 200 includes a motor 210 and a driving element 220 connected to the motor 210. The driving element 220 of the first mobile mechanism 200A is connected between the motor 210 and the first image source 110. The motor 210 of the first mobile mechanism 200A may drive the image receiving surface 114a (or a first display surface) of the first image source 110 to move relative to the first optical element 130 through the driving element 220, so as to adjust a distance k1 between a center of the first optical element 130 and the first image source 110 (for example, the image receiving surface 114a). In this way, the position of the first image M1 may be changed to adjust the distance k between the first image M1 and the second image M2. Similarly, the driving element 220 of the second mobile mechanism 200B is connected between the motor 210 and the second image source 120. The motor 210 of the second mobile mechanism 200B may drive the second display surface 122a (or, a second image receiving surface) of the second image source 120 to move relative to the first optical element 130 through the driving element 220, so as to adjust a distance k2 between the center of the first optical element 130 and the second image source 120 (for example, the second display surface 122a). In this way, the position of the second image M2 may be changed to adjust the distance k between the first image M1 and the second image M2. In the present embodiment, the first image source 110 and the second image source 120 are all selectively connected to the mobile mechanism 200, though the invention is not limited thereto, and as long as at least one of the first image source 110 and the second image source 120 is connected to the mobile mechanism 200, the mobile mechanism 200 may be used to adjust the distance k between the first image M1 and the second image M2.

In the present embodiment, the 3D floating image system 1000 further includes a user interface 400. The user interface 400 refers to an interface adapted to implement interaction between the user 10 and the 3D floating image system 1000. The user interface 400 is, for example, a gesture detector, a g-sensor or other types or sensor, though the invention is not limited thereto. The 3D floating image system 1000 further includes an interaction control device 500. The interaction control device 500 is used for controlling a peripheral sound and light system (not shown). The user interface 400 outputs a sensing signal according to an instruction of the user, and the application program 310 of the control and processing element 300 receives the sensing signal to synchronously update the foreground sub image content and the background sub image content output to the first image source 110 and the second image source 120 by the image processing unit 320 and a sound and light control signal output to the peripheral sound and light system by the interaction control device 500, so as to achieve the purpose of interacting with the user 10. Moreover, in the present embodiment, the 3D floating image of the 3D floating image system 1000 may also be used with an actual object to achieve a function of augmented reality (AR).

Figure 3:
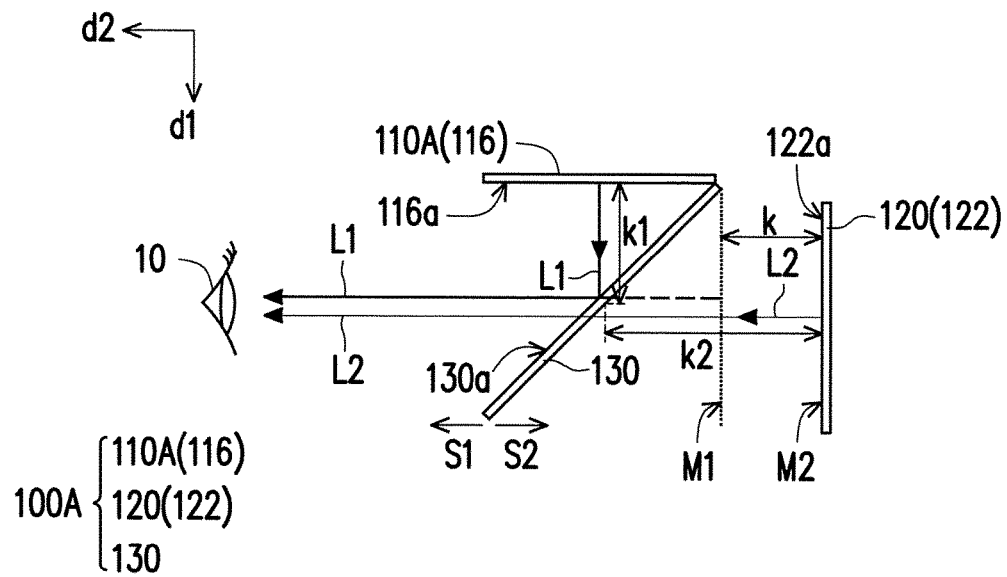
FIG. 3 is a schematic diagram of an optical mechanism of a 3D floating image system according to another embodiment of the invention.

FIG. 3 is a schematic diagram of an optical mechanism of the 3D floating image system according to another embodiment of the invention. The optical mechanism 100A of FIG. 3 is similar to the optical mechanism 100 of FIG. 1, and a difference there between is that the first image source 110A of the optical mechanism 100A is different to the first image source 110 of the optical mechanism 100. Referring to FIG. 3, in detail, the first image source 110A of the optical mechanism 100A may be a first display panel 116. The first display panel 116 provides the first image light L1. A first display surface 116a of the first display panel 116 is inclined relative to the reflecting surface 130a of the first optical element 130. A normal direction d1 of the first display surface 116a of the first display panel 116 is intersected with a normal direction d2 of the second display surface 122a of the second display panel 122. The aforementioned optical mechanism 100 may be replaced by the optical mechanism 100A to achieve another 3D floating image system having all of the functions of the aforementioned 3D floating image system 1000, which may be implemented by those skilled in the art according to the figures and the present specification, and a detail thereof is not repeated.

Figure 4:
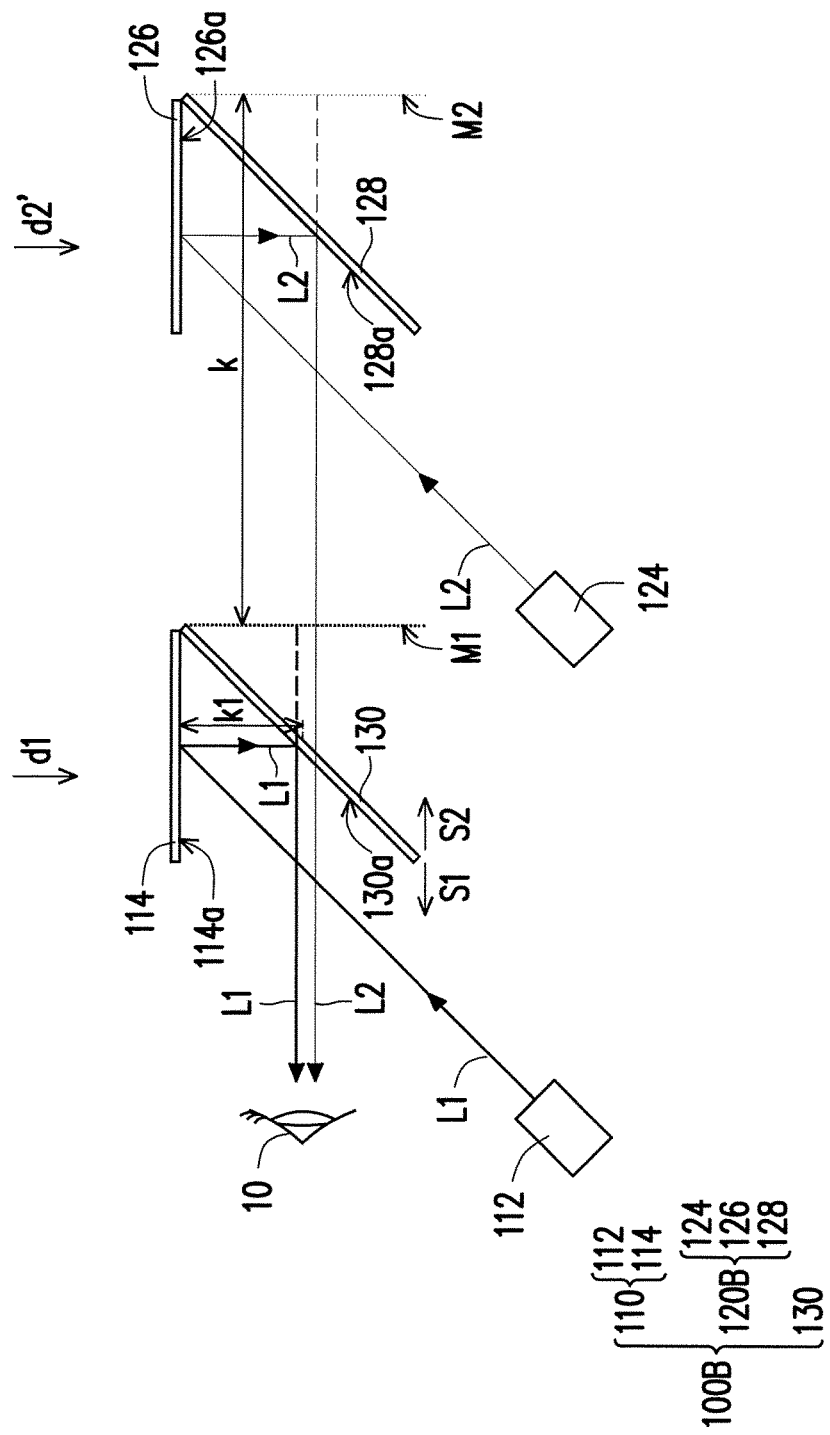
FIG. 4 is a schematic diagram of an optical mechanism of a 3D floating image system according to still another embodiment of the invention.

FIG. 4 is a schematic diagram of an optical mechanism of the 3D floating image system according to still another embodiment of the invention. The optical mechanism 100B of FIG. 4 is similar to the optical mechanism 100 of FIG. 1, and a difference there between is that the second image source 120B of the optical mechanism 100B is different to the second image source 120 of the optical mechanism 100. Referring to FIG. 4, in detail, the second image source 120B includes a second projector 124 used for providing the second image light L2, a second screen 126 and a second optical element 128. The second optical element 128 is inclined relative to the second screen 126. The second optical element 128 is a transflective element. For example, in the present embodiment, the second optical element 128 may be made of glass, acrylic or heat insulation paper. However, the invention is not limited thereto, and in other embodiments, the second optical element 128 may also be made of other proper materials. The second image beam L2 emitted by the second projector 124 is projected to the image receiving surface 126a of the second screen 126, reflected by the image receiving surface 126a of the second screen 126, reflected by the reflecting surface 128a of the second optical element 128 and passes through the first optical element 130 in sequence, and is transmitted to the eye of the user 10. In this way, the user 10 located at the first side S1 may view a virtual image located at the second side S2, i.e. the second image M2 of the present embodiment. In the present embodiment, the normal direction d1 of the image receiving surface 114a of the first screen 114 may be parallel to a normal direction d2' of the image receiving surface 126a of the second screen 126, though the invention is not limited thereto. The aforementioned optical mechanism 100 may be replaced by the optical mechanism 100B to achieve still another 3D floating image system having all of the functions of the aforementioned 3D floating image system 1000, which may be implemented by those skilled in the art according to the figures and the present specification, and a detail thereof is not repeated.

Figure 5:
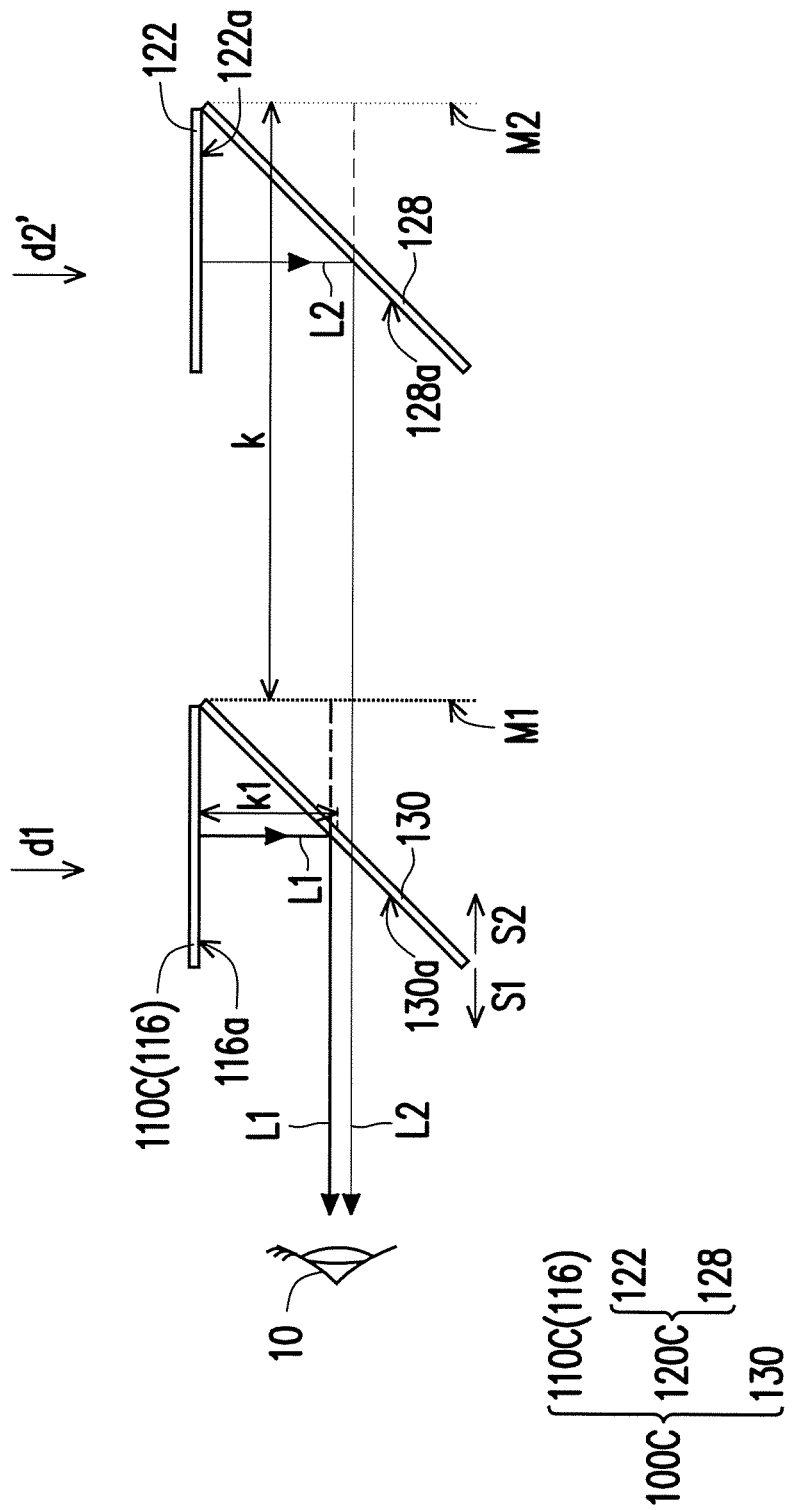
FIG. 5 is a schematic diagram of an optical mechanism of a 3D floating image system according to still another embodiment of the invention.

FIG. 5 is a schematic diagram of an optical mechanism of the 3D floating image system according to still another embodiment of the invention. The optical mechanism 100C of FIG. 5 is similar to the optical mechanism 100 of FIG. 1, and a difference there between is that the first image source 110C and the second image source 120C of the optical mechanism 100C is different to the first image source 110 and the second image source 120 of the optical mechanism 100. Referring to FIG. 5, in detail, the first image source 110C of the optical mechanism 100C may be the first display panel 116. The first image light L1 emitted by the first display panel 116 may be reflected by the reflecting surface 130a of the first optical element 130 and transmitted to the eye of the user 10 located at the first side S1. In this way, the user 10 located at the first side S1 may view a virtual image located at the second side S2, i.e. the first image M1 of the present embodiment. The second image source 120C includes the second display panel 122 and the second optical element 128. The second display surface 122a of the second display panel 122 is inclined relative to the reflecting surface 130a of the first optical element 130 and the reflecting surface 128a of the second optical element 128. The second image light L2 emitted by the second display panel 122 is reflected by the reflecting surface 128a of the second optical element 128 and passes through the first optical element 130 in sequence, and is transmitted to the eye of the user 10. In this way, the user 10 located at the first side S1 may view a virtual image located at the second side S2, i.e. the second image M2 of the present embodiment. In the present embodiment, the normal direction d1 of the first display surface 116a of the first display panel 116 may be parallel to a normal direction d2' of the second display surface 122a of the second display panel 122, though the invention is not limited thereto. The aforementioned optical mechanism 100 may be replaced by the optical mechanism 100C to achieve still another 3D floating image system having all of the functions of the aforementioned 3D floating image system 1000, which may be implemented by those skilled in the art according to the figures and the present specification, and a detail thereof is not repeated.

In summary, the 3D floating image system of an embodiment of the invention includes a first optical element, a first image source and a second image source. The first optical element has a first side and a second side opposite to each other. The first image source and the second image source are respectively located at the first side and the second side of the first optical element. A first image light provided by the first image source is reflected to the first side by the first optical element, and forms a first image at the second side. A second image light provided by the second image source is transmitted from the second side to the first side and passes through the first optical element, and forms a second image at the second side. The first image and the second image are spaced by a distance, and the distance is adjustable. In this way, the distance between the first image and the second image may be controlled according to application of image content, so as to form a vivid 3D floating image.

What is claimed is:

1. A three-dimensional floating image system, comprising:
    a control and processing element, having an application program and an image processing unit;
    a first optical element, having a first side and a second side opposite to each other;
    a first image source and a second image source, electrically connected to the image processing unit and respectively located at the first side and the second side of the first optical element, wherein the application program provides a mother image content to the image processing unit, the image processing unit divides the mother image content into a foreground sub image content and a background sub image content, the image processing unit inputs the foreground sub image content to the first image source and the background sub image content to the second image source, a first image light provided by the first image source is reflected to the first side by the first optical element, and forms a first image at the second side; and a second image light provided by the second image source is transmitted from the second side to the first side and passes through the first optical element, and forms a second image at the second side, the first image and the second image are spaced by a distance, and the distance is adjustable according to the foreground sub image content and the background sub image content.

2. The three-dimensional floating image system as claimed in claim 1, wherein a distance between the first optical element and the first image source, a distance between the first optical element and the second image source or a combination thereof is adjustable.

3. The three-dimensional floating image system as claimed in claim 1, further comprising:
    a mobile mechanism, connected to the first image source, the second image source or a combination thereof.

4. The three-dimensional floating image system as claimed in claim 3, wherein the mobile mechanism comprises:
    a motor; and
    a driving element, connected to the motor.

5. The three-dimensional floating image system as claimed in claim 1, wherein the first image source comprises:
    a first display panel, providing the first image light, wherein a first display surface of the first display panel is inclined relative to the first optical element.

6. The three-dimensional floating image system as claimed in claim 5, wherein the second image source comprises:
    a second display panel, providing the second image light, wherein a second display surface of the second display panel is inclined relative to the first optical element.

7. The three-dimensional floating image system as claimed in claim 6, wherein a normal direction of the first display surface is intersected with a normal direction of the second display surface.

8. The three-dimensional floating image system as claimed in claim 6, wherein the second image source further comprises:
    a second optical element, inclined relative to the second display surface, wherein the second image light is reflected by the second optical element and passes through the first optical element in sequence.

9. The three-dimensional floating image system as claimed in claim 8, wherein a normal direction of the first display surface is parallel with a normal direction of the second display surface.

10. The three-dimensional floating image system as claimed in claim 1, wherein the first image source comprises:
    a first projector, providing the first image light; and
    a first screen, inclined relative to the first optical element, wherein the first image light is sequentially reflected by the first screen and reflected by the first optical element.

11. The three-dimensional floating image system as claimed in claim 10, wherein the second image source comprises:
    a second display panel, providing the second image light, wherein a second display surface of the second display panel is inclined relative to the first optical element.

12. The three-dimensional floating image system as claimed in claim 11, wherein a normal direction of an image receiving surface of the first screen is intersected with a normal direction of the second display surface.

13. The three-dimensional floating image system as claimed in claim 10, wherein the second image source comprises:
    a second projector, providing the second image light;

a second screen; and a second optical element, inclined relative to the second screen, wherein the second image light is reflected by the second screen, reflected by the second optical element and passes through the first optical element in sequence.

14. The three-dimensional floating image system as claimed in claim 13, wherein a normal direction of an image receiving surface of the first screen is parallel with a normal direction of an image receiving surface of the second screen.

* * * * *